United States Patent [19]

Piskala

[11] 3,869,446

[45] Mar. 4, 1975

[54] PROCESS OF PREPARING 6-AZAPYRIMIDINE RIBONUCLEOSIDES

[75] Inventor: Alois Piskala, Frantisek Sorm, Prague, Czechoslovakia

[73] Assignee: Ceskoslovenska akademie ved, Prague, Czechoslovakia

[22] Filed: Nov. 15, 1972

[21] Appl. No.: 306,838

[30] Foreign Application Priority Data
Nov. 18, 1971 Czechoslovakia ................ 8085-71
Nov. 23, 1971 Czechoslovakia ................ 8163-71

[52] U.S. Cl. .................... 260/211.5 R, 260/248 AS
[51] Int. Cl. ............................................ C07d 51/52
[58] Field of Search ................ 260/221.5 R, 248 AS

[56] References Cited
UNITED STATES PATENTS
3,328,388   6/1967   Shen et al. .................... 260/211.5 R
3,412,083   11/1968   Restivo ....................... 260/211.5 R

*Primary Examiner*—Johnnie R. Brown
*Attorney, Agent, or Firm*—Murray Schaffer

[57] ABSTRACT

The 6-azapyrimidine ribonucleosides and their per-O-acryl derivatives, useful in treatment of psoriasis, and some diseases of viral origin are prepared via 3,5-bis-alkylthio(or benzylthio)-1,2,4-triazines, 5-alkoxy(Or benzyloxy)-3-alkylthio(or benzylthio)-1,2,4-triazines, 3,5-di-alkoxy(or benzyloxy)-1,2,4-triazines, and 2-(2,3,5-tri-0-acyl-β-D-ribofuranosyl)-3-alkylthio(or benzyl)-1,2,4-triazin-5(2H)-ones or 2-(2,3,5-tri-O-acyl-β-D-ribofuranosyl)-5-alkoxy(or benzyloxy)-1,2,4-triazin-3(2H)-ones.

4 Claims, No Drawings

PROCESS OF PREPARING 6-AZAPYRIMIDINE RIBONUCLEOSIDES

BACKGROUND OF THE INVENTION

This invention relates to a process of preparing 6-azapyrimidine ribonucleosides.

The 2-β-ribofuranosyl-1,2,4-triazine-3,5(2H,4H)-dione (6-azauridine) appears the most important representative of the 6-azapyrimidine ribonucleoside series. In recent time, 6-azaridine has been widely used in biochemical and farmacological research as well as in clinical praxis. The corresponding 6-azauridine 2',3',5'-triacetate is used in treatment of psoriasis, and some diseases of viral origin.

6-Azauridine is prepared according to the Czechoslovak Pat. No. 88,063 by an anzymatical route. This process which is also used on an industrial scale, starts from a cheap raw material but the isolation of the product is expensive. Another Czechoslovak Pat. No. 105,367, consists in the reaction between 3-diphenylmethyl-6-azauracil mercuric salt and tribenzoylribofuranosyl chloride and the subsequent stepwise removal of protecting groups by hydrogenolysis and alcoholysis or ammonolysis. The latter method is more general than the fermentation process but is rather laborious. A low yield of 6-azauridine may be also obtained by reaction of 3-methylthio-1,2,4-triazin-5(2H)-one mercuric salt with tribenzoylribofuranosyl chloride to give a protected ribofuranosylmethylthiotriazinone which is not isolated but directly subjected to an acidic hydrolysis under the formation of 2',3',5'-tri-O-benzoyl-6-azauridine; the last step consists in ammonolysis of the latter tribenzoate [A. R. Restivo and F. A. Dondzila: J. Or. Chem. 27, 2281 (1962)]. In addition to the above methods, 6-azauridine has been prepared with the use of trimethylsilyl process [C. Cristescu: Rev. Roumaine Chim. 13, 365 (1968); H. Vorbruggen and U. Niedballa: Angew. Chem. 82, 449 (1970)] which is relatively simple and affords higher yields than the mercuri process; on the other hand, the high price of the usual trimethylsilylating agents must be borne in mind. 6-Azauridine is administered to patients in the form of 2',3',5'-tri-O-acetyl-6-azauridine. None of the above methods is suitable for a direct synthesis of this triacetate. The acetylation of 6-azauridine is effected according to Czechoslovak Pat. No. 111,202.

We have now discovered an additional process of preparing the 6-azapyrimidine ribonucleosides by a simple route; the yields are satisfactory and in some cases excellent. The present process is also suitable for a direct synthesis of 2',3',5'-tri-O-acetyl-6-azauridine.

SUMMARY OF THE INVENTION

The present invention relates to a process of preparing 6-azapyrimidine ribonucleosides according to the general formula I

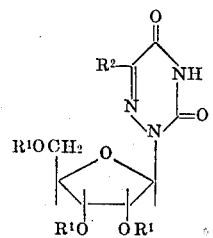

(I)

wherein $R^1$ is hydrogen or an acyl group and $R^2$ is hydrogen or an alkyl consisting of 1–6 carbon atoms, which process comprises treating 3,5-bis-alkylthio(or benzylthio)-1,2,4-triazines according to the general formula II

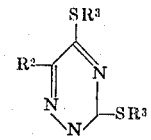

(II)

wherein $R^2$ is the same as in formula I and $R^3$ is an alkyl consisting of 1–6 carbon atoms or the benzyl group, at room temperature with an equimolar amount of alkali metal alkoxides, preferably sodium alkoxydes, in alkanols consisting of 1–6 carbon atoms or in benzyl alcohol, thereby forming 5-alkoxy(or benzyloxy)-3-alkylthio(or benzylthio)-1,2,4-triazine according to the general formula III

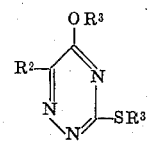

(III)

wherein $R^2$ and $R^3$ are the same as in formula I and II, treating the latter compound III with an excess of alkali metal alkoxides, preferably sodium alkoxides, in alkanols consisting of 1–6 carbon atoms or in benzyl alcohol, in the presence of alkylating agents, preferably methyl iodide, or in the presence of anhydrous salts of heavy metals, preferably mercuric salts, at elevated temperatures, preferably at 60°–100 °C, thereby forming 3,5-di-alkoxy(or benzyloxy)-1,2,4-triazine according to the general formula IV.

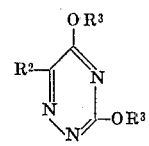

(IV)

wherein $R^2$ and $R^3$ are the same as in formula II, condensing the aforesaid compounds III or IV with para-cylribofuranosyl halides, thereby forming (from compounds III) the 2-(2,3,5-tri-O-acyl-β-D-ribofuranosyl)-3-alkylthio(or benzylthio)-1,2,4-triazin-5(2H)-ones according to the general formula V

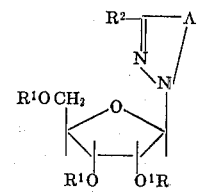

(V)

wherein A is a

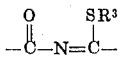

group and $R^1$, $R^2$, and $R^3$ are the same as in formulae I and II, or forming (from compounds IV) the 2-(2,3,5-tri-O-actyl-β-D-ribofuranosyl)-5-alkoxy(or benzyloxy)-1,2,4-triazin-3(2H)-ones according to the aforesaid general formula V, wherein A is a

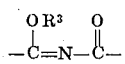

group and $R^1$, $R^2$, and $R^3$ are the same as in formulae I and II, dealkylating or hydrolysing selectively the aforesaid compounds according to the general formula V, wherein A is the

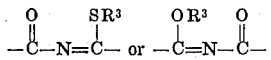

group and $R^1$, $R^2$, and $R^3$ are the same as in formulae I and II, thereby forming the 6-azapyrimidne nucleosides according to the general formula I, wherein $R^1$ is an acyl group and $R^2$ is hydrogen or an alkyl consisting of 1–6 carbon atoms, and converting the latter compounds, if required, by a known procedure into compounds according to the general formula I, wherein $R^1$ is hydrogen and $R^2$ is hydrogen or an alkyl consisting of 1–6 carbon atoms.

The preparation of compounds according to the general formula III by reaction of compounds according to the general formula II with alkali metal alkoxides is performed preferably in equimolar ratio with the use of sodium alkoxide in the corresponding alkanol at room temperature. The reaction rate depends on the structure and concentration of the alkoxide and on the character of substituents $R^2$ at position 6 of compounds according to the general formula II. The reaction is considerably faster with compounds where $R^2$ is hydrogen than with those where $R^2$ is a lower alkyl group. The reaction is usually accomplished within 20 minutes to 24 hours. The optimum reaction period of time may be for the particular case determined by thin-layer chromatography on silica gel containing fluorescent indicator. The separation of starting compounds II from the products III is preferably performed in benzene-ethyl acetate solvent mixtures. Detection of compounds II and III is performed under ultraviolet light. The alkyl sulfide or benzyl sulfide ions set free by the reaction, made dealkylate the resulting compounds according to the general formula III under the formation of 3-alkylthio(or benzylthio)- 1,2,4-triazin-5(2H)-ones as by-products. This side reaction is slow at room temperature and its extent is negligible in most cases. The negative effect of sulfide ions may be suppressed by the addition of an alkylating agent, preferably methyl iodide to the reaction mixture. By this addition, the sulfide ions are alkylated under the formation of dialkyl sulfides which are harmless. Another slow side reaction consists in substitution of the alkylthio or benzylthio group at position 3 of the triazine ring leading to 3,5-dialkoxy-1,2,4-triazines. The formation of the latter by-products may be suppressed to a negligible extent by the choice of optimum reaction periods of time.

The preparation of 3,5-di-alkoxy(or benzyloxy)-1,2,4-triazines according to the general formula IV by reaction of 5-alkoxy(or benzyloxy)-3-alkylthio(or benzylthio)-1,2,4-triazines according to the general formula III with alkali metal alkoxides is preferably performed with the use of an excess of sodium alkoxide in the presence of the corresponding alkanol. The reaction rate depends on the structure and concentration of the alkoxide as well as on the character of the substituent at position 6 of compound III. At room temperature, the reaction proceeds very slowly. It is therefore advisable to work at elevated temperatures, preferably at 60° – 100°C. The optimum reaction period of time may be readily determined by thin-layer chromatography on silica gel containing fluorescent indicator. The starting compounds III are easily separated from the reaction products IV is benzene-ethyl acetate solvent mixtures. Both compounds III and IV are readily detected by viewing under ultraviolet lamp. The reaction time usually varies between two and ten hours. Because of the dealkylating action of alkyl sulfide or benzyl sulfide ions (formed by the reaction) on compounds III or IV, satisfactory yields of 3,5-dialkoxy(or benzyloxy)-1,2,4-triazines IV may be obtained only in that case when the sulfide ions aforesaid are removed from the reaction medium. The alkyl sulfide or benzyl sulfide ions may be removed by the addition of alkylating agents, preferably methyl iodide, or by the addition of anhydrous salts of heavy metals, preferably mercuric salts. In the former case, the alkyl sulfide or benzyl sulfide ions are alkylated to harmless dialkyl sulfides of alkyl benzyl sulfides; in the latter case, the alkyl sulfide or benzyl sulfide ions are converted to the insoluble salts. The use of alkylating agents may be accompanied by a competitive reaction with alkoxide ions, especially when the desired substitution on the triazine ring is slow. In such a case additional stoechiometric amounts of the alkylating agent and of the alkali metal alkoxide must be introduced into the reaction mixture during the reaction. In the case of salts of heavy metals, it is advantageous to add one equivalent of the heavy metal salt and two equivalent of sodium alkoxide per one mole of 5-alkoxy(or benzyloxy)-3-alkylthio(or benzylthio)-1,2,4-triazine according to the general formula III.

5-Alkoxy(or benzyloxy)-3-alkylthio(or benzylthio)-1,2,4-triazines according to the general formula III are obtained on preparative scale from the readily accessible 1,2,4-triazine-3,5(2H,4H)-dithiones without isolating the intermediary 3,5-bis-alkylthio(or benzylthio)-1,2,4-triazines according to the general formula II. Also in the synthesis of 3,5-di-alkoxy(or benzyloxy)-1,2,4-triazines according to the general formula IV it is not necessary to isolate the intermediates according to the general formula III; from the preparative standpoint, it is more advantageous to start from 1,2,4-triazine-3,5(2H,4H)-dithiones or 3,5-bis-alkylthio(or benzylthio)-1,2,4-triazines according to the general formula II than from 5-alkoxy(or benzyloxy)-3-alkylthio(or benzylthio)-1,2,4-triazines according to the general formula III.

Condensation of compounds according to the general formula III with peracylribofuranosyl halides affords the 2-(2,3,5-tri-O-acyl-β-D-ribofuranosyl)-3-alkylthio(or benzylthio)-1,2,4-triazin-5(2H)-ones according to the general formula V, wherein A is a —C(:O)—N:C($SR^3$)—group. This condensation is performed in inert solvents, preferably in anhydrous acetonitrile, at temperatures between 60°C and 150°C, preferably at 80°–100°C. Equimolar amounts of reactants are used or a 10–20% excess of compounds III is applied. The reaction time usually varies between 2 and 10 hours. The condensation may be catalysed by mercuric salts such as mercuric bromide. The catalysed condensation is then performed preferably at room temperature and the reaction time varies between 24 and 72 hours.

Condensation of compounds according to the general formula IV with peracrylribofuranosyl halides affords the 2-(2,3,5-tri-O-acyl-β-D-ribofuranosyl)-5-alkoxy(or benzyloxy)-1,2,4-triazin-3(2H)-ones according to the general formula V wherein A is a —C(OR³)—:N—C(:O)—group. This condensation is performed in inert solvents, preferably in anhydrous acetonitrile, at temperatures between 60°C and 150°C, preferably at 80°-100°C. Equimolar amounts of reactants are used or a 10–20% excess of compounds IV is applied. The condensation may be catalysed by mercuric salts such as mercuric bromide. The catalysed condensation is then performed preferably at room temperature and the reaction time varies between 8 and 48 hours.

The selective hydrolysis of compounds according to the general formula V, wherein A is a —C(:O)—N:C(SR³)—group, affords the protected nucleosides according to the general formula I, wherein $R^1$ is an acyl group. This selective hydrolysis is performed at room temperature in the medium of acetic acid and in the presence of a small excess of hydrogen peroxide. When the hydroxylic functions are protected by labile acyl groups, it is advantageous to perform the selective hydrolysis in the presence of one equivalent of sodium acetate to suppress the acidity of the alkanesulfonic acid formed. The reaction time varies between 8 to 48 hours and can be considerably shortened by the use of elevated temperatures.

The compounds according to the general formula V, wherein A is a —C(OR³);N—C(:O)—group, are converted to protected 6-azapyrimidine ribonucleosides according to the general formula I, wherein $R^1$ is an acyl group, by dealkylation or selective hydrolysis. The dealkylation is performed at room temperature by the action of hydrogen halides, preferably hydrogen chloride, in aprotic solvents, preferably benzene or ether, in the presence of small amounts of acetyl chloride or acetic anhydride to remove traces of moisture, if any; the reaction time varies between 6–24 hours. The selection hydrolysis is performed by the action of mineral acids or, more advantageously, by the action of a strongly acidic cation exchange resin in the $H^+$ cycle in an aqueous-alcoholic medium; the hydrolysis proceeds at room temperature and is usually finished in the course of 1–8 hours. When the protecting groups are labile towards mineral acids, the selective hydrolysis is preferably performed by heating in water or acetic acid.

The protected 6-azapyrimide ribonucleosides according to the general formula I, wherein $R^1$ is an acyl, are converted to the free 6-azapyrimidine ribonucleosides according to the general formula I, wherein $R^1$ is hydrogen, by a known procedure, namely, ammonolysis or alcoholysis, preferably methanolysis. The aforesaid free nucleosides may be also obtained from compounds according to the general formula V by a combination of alcoholysis, preferably methanolysis, with a hydrolysis without isolating the intermediates. The hydrolysis is preferably performed with the use of a strongly acidic cation exchange resin in the $H^+$ form which simultaneously removes cations from the reaction medium.

The invention is illustrated by the following examples but is not limited thereto.

DESCRIPTION OF PREFERRED EMBODIMENTS

5-Methoxy-3-methylthio-1,2,4-triazine

Example 1. A solution of 3,5-bis(methylthio)-1,2,4-triazine (17.3 g) in 0.33 N methanolic sodium methoxide (300 ml) is kept at room temperature in a stopped flask for 45 minutes. The solution is neutralised with Dry ice and evaporated under diminished pressure at 30°–35°C (bath temperature). The residue is dissolved in water (100 ml) and the solution is extracted with two 50 ml portions of chloroform. The extracts are combined, dried over sodium sulfate, and evaporated under diminished pressure. The residue is dissolved in hot benzene (20 ml), the solution is diluted with light petroleum (100 ml), stirred with aluminum oxide, and filtered. The filtrate is diluted with additional light petroleum (100 ml) and allowed to crystallize. Overal yield (the mother liquors are processed as usual), 13.6 g (87%) of the title compound; m.p. 66°–68°C.

5-Methoxy-6-methyl-3-methylthio-1,2,4-triazine

Example 2. A solution of 6-methyl-3,5-bis-(methylthio)-1,2,4-triazine (18.7 g) in 0.33 N methanolic sodium methoxide (300 ml) is kept at room temperature for 10 hours and processed analogously to Example 1 to afford total 15.0 g (88%) of the title compound; m.p. 82°–83°C.

3,5-Dimethoxy-1,2,4-triazine

Example 3. A mixture of 5-methoxy-3-methylthio-1,2,4-triazine (1.57 g), 0.5 N methanolic sodium methoxide (20 ml), and methyl iodide (0.6 ml) is refluxed for 4.5 hours (potassium hydroxide guard tube). In the course of the reaction, the mixture is treated in 90-min intervals for the first time with 10 ml of 1N methanolic sodium methoxide and 0.6 ml of methyl iodide, and for the second time with 5 ml of 1N methanolic sodium methoxide. The reaction mixture is then cooled down to room temperature, neutralised with Dry ice, and evaporated under diminished pressure at 30°–35°C (bath temperature). The residue is dissolved in ice cold water (10 ml), the solution treated with sodium hydrogen sulfide (0.1 g) and extracted with two 10 ml portions of chloroform. The extracts are combined, filtered with active charcoal, dried over sodium sulfate, and evaporated under diminished pressure at 30°–35°C (bath temperature). The product is dried for 20 minutes under vacuum of a water pump. Yield, 1.10 g (78%) of the title compound; m.p. 58°–61°C.

Example 4. A mixture of 5-methoxy-3-methylthio-1,2,4-triazine (1.57 g), 1 N methanolic sodium methoxide (20 ml), methanol (absolute; 10 ml), and 1.6 g of mercuric acetate is refluxed under magnetic stirring for 2 hours (potassium hydroxide guard tube), cooled down, and saturated with dry hydrogen sulfide for 10 minutes. The brick-red precipitate is filtered off through a thin layer of Cellite and washed with methanol. The filtrate and washings are combined and evaporated under diminished pressure at 30°–35°C (bath temperature). The residue is dissolved in icecold water (10 ml) and the solution is extracted with two 10 ml portions of chloroform. The extracts are combined, dried over sodium sulfate, and evaporated under diminished pressure. The product is dried for 20 minutes under vacuum of a water pump. Yield, 1.10 g (78%) of the title compound; m.p. 58°–61°C.

Example 5. A mixture of 5-methoxy-3-methylthio-1,2,4-triazine, absolute methanol (20 ml), and 1N methanolic sodium methoxide (10 ml) is refluxed for 15 minutes (potassium hydroxide guard tube), cooled down, neutralised with Dry ice, and evaporated under diminished pressure at 30°–35°C (bath temperature). The residue is thoroughly triturated with 20 ml benzene; the insoluble portion is filtered off and washed with benzene. The filtrate and washing are combined and evaporated under diminished pressure. The residue is dissolved in a mixture of absolute methanol (10 ml) and 1N methanolic sodium methoxide (5 ml), the whole is refluxed for 2 hours (potassium hydroxide guard tube), cooled down, neutralised with Dry ice, and evaporated under diminished pressure. The residue is dissolved in icecold water (10 ml) and the solution is extracted with two 10 ml portions of chloroform. The extracts are combined, dried over sodium sulfate, evaporated under diminished pressure, and the residue dried for 20 minutes under vacuum of a water pump. Yield, 0.80 g (57%) of the title compound; m.p. 58°–61°C.

3,5-Dimethoxy-6-methyl-1,2,4-triazine

Example 6. A mixture of 5-methoxy-6-methyl-3-methylthio-1,2,4-triazine (1.71 g), absolute methanol (10 ml), 1N methanolic sodium methoxide (20 ml), and mercuric acetate (1.6 g) is refluxed under magnetic stirring for 8 hours (potassium hydroxide guard tube) and then processed analogously to Example 2. Yield, 1.19 g (77%) of the title compound; m.p. 98°–100°C.

Example 7. A mixture of 5-methoxy-6-methyl-3-methylthio-1,2,4-triazine (1.71 g), absolute methanol (10 ml), 1N methanolic sodium methoxide (10 ml) and methyl iodide (0.6 ml) is refluxed for 10 hours (potassium hydroxide guard tube). The reaction mixture is treated in 1-hour intervals twice with a mixture of 10 ml of 1N methanolic sodium methoxide and 0.6 ml of methyl iodide and finaly with 10 ml of 1N methanolic sodium methoxide alone. The final reaction mixture is then processed analogously to Example 1. Yield, 0.90 g (58%) of the title compound; m.p. 98°–100°C.

2-(2,3,5-Tri-O-benzoyl-β-D-ribofiranosyl)-3-methylthio-1,2,4-triazine-5(2H)-one Example 8. A solution of 1O-acetyl-2,3,5-tri-O-benzoyl-β-D-ribofuranose in dry benzene (5.04 g in 25 ml) is treated with acetyl chloride (0.5 ml) and then saturated under external icecooling and exclusion of atmospheric moisture with a rich stream of anhydrous hydrogen chloride for 30 minutes. The final solution is kept at room temperature for 3 hours (calcium chloride guard tube) and evaporated under diminished pressure at 30°–35°C (bath temperature). The residual colorless sirup of 2,3,5-tri-O-benzoyl-D-ribofuranosyl 0chloride is coevaporated under diminished pressure with two 20 ml portions of dry toluene and finally treated with 20 ml of dry acetonitrile and 1.57 g of 5-methoxy-3-methylthio-1,2,4-triazine. The resulting solution is refluxed (calcium chloride guard tube) for 10 hours in an oil bath (100°C), evaporated under diminished pressure at 30°–35°C (bath temperature), and the residue chromatographed on a column of silica gel (100 g). The column is washed with 500 ml of a 9:1 benzene-ethyl acetate mixture and the product is eluted with a 8:2 benzene-ethyl acetate solvent mixture. The course of elution is checked by means of thin-layer chromatography on silica gel. The chromatographically homogeneous fractions are combined, evaporated under diminished pressure, and the residue dried at 50°C in vacuo. Yield, 3.50 g (60%) of the title compound in the form of a chromatographically homogeneous solid foam which does not crystallise from common solvents. Optical rotation: $[\alpha]_D^{25}$ −38 −1° (c 0.5; chloroform). Infrared spectrum (chloroform): $\nu(C=O)$ 1676 cm$^{-1}$, 1665 cm$^{-1}$ (inflex), and 1727 cm$^{-1}$; $\nu(C=N)$ 1481 cm$^{-1}$.

2-(2,3,5-tri-O-benzoyl-β-D-ribofuranosyl)-6-methyl-3-methylthio-1,2,4-triazin-5(2H)-one Example 9. A mixture of 2,3,5-tri-O-benzoyl-ribofuranosyl chloride (prepared from 5.04 g of 1O-acetyl-2,3,5-tri-O-benzyl-β-D-ribofuranose, of Example 3). 5-methoxy-6-methyl-3-methylthio-1,2,4-triazine (1.71 g) and dry acetonitrile (20 ml) is refluxed (calcium chloride guard tube) in an oil bath for 6 hours and the processed analogously to Example 8. Yield, 5.2 g (87%) of the title compound in the form of chromatographically homogeneous solid foam which does not crystallise from common solvents. Optical rotation: $[\alpha]_D^{25}$ −46.9° (c 0.5; chloroform). Infrared spectrum (chloroform): $\nu(C=O)$ 1,663 cm$^{-1}$ and 1,728 cm$^{-1}$, $\nu(C=N)$ 1,484 cm$^{-1}$.

2-(2,3,5-tri-O-benozyl-β-D-ribofuranosyl)-5-methoxy-1,2,4-triazin-3(2H)-one

Example 10. A solution containing 1-O-acetyl-2,3,5-tri-O-benzoyl-β-D-ribofuranose (5.04 g), dry benzene (25 ml), and acetyl chloride (0.5 ml) is saturated for 30 minutes with dry hydrogen chloride under external icecooling and exclusion of atmospheric moisture. The reaction mixture is then kept at room temperature for 3 hours (calcium chloride guard tube) and evaporated under diminished pressure at 30°–35°C (bath temperature). The residual almost colorless sirup of 2,3,5-tri-O-benzoyl-D-ribofuranosyl 0chloride is coevaporated under diminished pressure with two 20 ml portions of dry toluene at 30°–35°C (bath temperature) and finally treated with dry acetonitrile (20 ml) and 3,5-dimethoxy-1,2,4-triazine (1.41 g). The resulting solution is refluxed (calcium chloride guard tube) in on oil bath (100°C) for 8 hours, evaporated under diminished pressure at 30°–35°C (bath temperature), and the residue chromatographed on a column of silica gel (100 g). The column is washed with 500 ml of a 9:1 mixture of benzene-ethyl acetate. The principal product is eluted from the column with a 8:2 benzene-ethyl acetate mixture. The course of elution is checked by thin-layer chromatography on silica gel. The chromatographically homogeneous fractions are combined, evaporated, and the residue crystallised from methanol. Yield, 3.8 g (67%) of the title compound; m.p. 133°–135°C.

Example 11. A mixture of 2,3,5-tri-O-benzoyl-D-ribofuramosyl chloride (prepared from 5.04 g of 1-O-acetyl-2,3,5-tri-O-benzoyl-β-D-ribofuranose; of. Example 10), 3,5-dimethoxy-1,2,4-triazine (1.41 g), dry acetonitrile (20 ml), and mercuric bromide (0.36 g) is homogenized, the resulting solution kept at room temperature in a stoppered flask for 3 days, and evaporated under diminished pressure at 30°–35°C (bath temperature). The residue is dissolved in chloroform (50 ml), the solution washed with two 10 ml portions of 30% aqueous potassium iodide, dried over sodium sulfate, and evaporated under diminished pressure at 30°–35°C (bath temperature). The crude residue is chromatographed on a column of silica gel (see Example 10). The main crop is crystallised from methanol. Yield, 4.40 g (77%) of the title compound; m.p. 133°–135°C.

2-(2,3,5-Tri-O-acetyl-β-D-ribofuranosyl)5-methoxy-1,2,4-triazin-3(2H)-one

Example 12. A solution containing 1,2,3,5-tetra-O-acetyl-β-D-ribofuranose (3.18 g), dry benzene (20 ml), and acetyl chloride (0.5 ml) is saturated for 30 minutes with anhydrous hydrogen chloride under external ice-cooling and exclusion of atmospheric moisture. The reaction mixture is then kept at room temperature for 3 hours (calcium chloride guard tube) and evaporated under diminished pressure at 30°–35°C (bath temperature). The residual colorless sirup of 2,3,5-tri-O-acetyl-D-ribofuranosyl chloride is codistilled with two 20 ml portions of dry toluene, and treated with dry acetonitrile (20 ml) and 3,5-dimethoxy-1,2,4-triazine (1.41 g). The resulting solution is refluxed (calcium chloride guard tube) in on oil bath (100°C) for 8 hours and evaporated under diminished pressure at 30°–35°C (bath temperature). The residue is chromatographed on a column of silica gel (100 g). The column is washed successively with 500 ml of a 9:1 benzene-ethyl acetate mixture and 750 ml of a 8:2 benzene-ethyl acetate mixture. The principal product is eluted from the column with 750 ml of a 1:1 benzene-ethyl acetate solvent mixture. Yield, 2.9 g (75%) of the title compound in the form of chromatographically homogeneous thick sirup.

2-(2,3,5-Tri-O-benzoyl-β-D-ribofuranosyl)-5-methoxy-6-methyl-1,2,4-triazine-3(2H)-one Example 13. A mixture of 2,3,5-tri-O-benzoyl-D-ribofuranosyl chloride (prepared from 5.04 g of 1-O-acetyl-2,3,5-tri-O-benzoyl-β-D-ribofuranose; cf. Example 10), 3,5-dimethoxy-6-methyl-1,2,4-triazine (1.55 g), and dry acetonitrile (20 ml) is refluxed (calcium chloride guard tube) for 6 hours and then processed analogously to Example 10. The product is crystallised from methanol. Yield, 4.85 g (83%) of the title compound. m.p. 139°–141°C.

2',3',5'-Tri-O-benzoyl-6-azauridine -tri-O-benzoyl-β

Example 14. A solution of 2-(2,3,5-tri-0-benzoyl-β-D-ribofuranosyl)-3-methylthio-1,2,4-triazin-5(2H)-one (0.587 g) in a mixture of glacial acetic acid (5 ml) and 20% aqueous hydrogen peroxide (0.4 ml) is kept in a stoppered flask at room temperature for 24 hours. The solid is collected with suction, washed with ether, and dried. Yield, 0.460 g (83%) of the title compound. M.p. 192°–194°C. Optical rotation: $[\alpha]_D^{25}$ −51.5° (c 1.3; pyridine).

Example 15. A mixture of 2-(2,3,5-tri-O-benzoyl-β-D-ribofuranosyl)-5-methoxy-1,2,4-triazin-3(2H)-one (0.571 g), dry benzene (2 ml), and 4M etheral hydrogen chloride (5 ml) is kept at room temperature in a stoppered flask for 24 hours under occasional stirring. The starting compound dissolves little by little; after several hours, the reaction product begins to separate. The solid is then collected with suction, washed with ether, and dried under diminished pressure over concentrated sulfuric acid and potassium hydroxide pellets. Yield, 0.550 g (99%) of the title compound; m.p. 189°–192°C. The recrystallised product melts at 192°–194°C (chloroform-light petroleum).

2',3',5'-Tri-O-acetyl-6-azauridine

EXAMPLE 16. A solution containing 1,2,3,5-tetra-O-acetyl-β-D-ribofuranose (3.18 g), dry benzene (20 ml), and acetyl chloride (0.5 ml) is saturated for 30 minutes with a rich stream of anhydrous hydrogen chloride under external ice-cooling and exclusion of atmospheric moisture. The resulting solution is kept (calcium chloride guard tube) at room temperature for 3 hours and evaporated under diminished pressure at 30°–35°C (bath temperature). The residual colorless sirup of 2,3,5-tri-O-acetyl-D-ribofuramosyl 0chloride is codistilled with two 20 ml portions of dry toluene and then treated with dry acetonitrile (20 ml), 5-methoxy-3-methylthio-1,2,4-triazine (1.57 g), and mercuric bromide (0.36 g). The resulting solution is kept in a stoppered flask at room temperature for 3 days and then evaporated under diminished pressure at 30°–35°C (bath temperature). The residual is dissolved in chloroform (50 ml), the solution washed successively with two 10 ml portions of 30% aqueous potassium iodide and two 10 ml portions of water, dried over sodium sulfate, and evaporated under diminished pressure. The residue is chromatographed on a column of silica gel analogously to Example 8 to afford 2.7 g of 2-(2,3,5-tri-O-acetyl-β-D-ribofuranosyl)-3-methylthio-1,2,4-triazin-5(2H)-one in the form of a thick sirup. The sirup is dissolved in glacial acetic acid (35 ml), the solution treated with 19% aqueous hydrogen peroxide (2.8 ml), and the whole mixture is kept at room temperature for 24 hours. The resulting solution is evaporated under diminished pressure, the residue dissolved in water (40 ml), and the aqueous solution extracted with three 20 ml portions of chloroform. The extracts are combined, dried over sodium sulfate, and evaporated under diminished pressure to the consistence of a thick sirup. The sirup is diluted with ether until turbid, seeded, and allowed to crystallise at room temperature. The mother liquors are purified by chromatography. Overall yield, 2.3 g of the title compound (62%, referred to tetraacetylribofuranose); m.p. 99°–102°C.

EXAMPLE 17. A solution containing 2-(2,3,5-tri-D-acetyl-β-D-ribofuranosyl)-5-methoxy-1,2,4-triazin-3(2H)-one (0.385 g), 4M ethereal hydrogen chloride (5 ml), and acetyl chloride (0.3 ml) is kept at room temperature in a stoppered flask for 24 hours, evaporated under diminished pressure at 30°–35°C (bath temperature), and the residue coevaporated successively with two 5 ml portions of dry benzene and one 5 ml portion of isopropyl alcohol. The final residue is dissolved in 1 ml of isopropyl alcohol and the solution seeded. Overall yield, 0.295 g (80%) of the title compound; m.p. 99°–102°C.

2',3',5'-Tri-O-benzoyl-5-methyl-6-azauridine

EXAMPLE 18. A solution of 2-(2,3,5-tri-O-benzoyl-β-D-ribofuranosyl)-6-methyl-3-methylthio-1,2,4-triazin-5(2H)-one (0.601 g) in a mixture of glacial acetic acid 5 ml) and 20% aqueous hydrogen peroxide (0.4 ml) is kept at room temperature in a stoppered flask for 24 hours. The resulting solution is treated with sodium acetate (0.1 g) and the whole mixture is evaporated under diminished pressure at 30°–35°C (bath temperature). The residue is dissolved in chloroform (10 ml), the solution washed with two 10 ml portions of water, dried over sodium sulfate, and evaporated under diminished pressure. The residue is co-evaporated with ethanol (10 ml) and then crystallised from the same solvent. Yield, 0.472 g (82%) of the title compound. M.p. 129°–131°C. Optical rotation: $[\alpha]_D^{25}$ −55° (c 0.4; pyridine).

EXAMPLE 19. A solution of 0.585 g of 2-(2,3,5-tri-O-benzoyl-β-D-ribofuranosyl)-5-methoxy-6-methyl-1,2,4-triazin-3(2H)-one in 2 ml of dry benzene is treated with 4M ethereal hydrogen chloride (5 ml), the whole mixture is kept at room temperature in a stoppered flask for 24 hours, and evaporated under diminished pressure at 30°–35°C (bath temperature). The residue is coevaporated successively with two 5 ml portions of dry benzene and two 5 portions of ethanol. The final residue is crystallised from ethanol, Yield, 0.47 g (82%) of the title compound; m.p. 129°–131°C.

We claim:
1. Process of preparing 6-azapyrimide ribonucleosides according to the general formula I

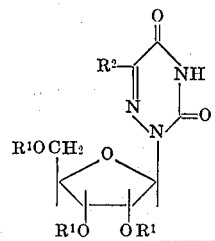   (I)

wherein R¹ is hydrogen or an acetyl or benzoyl and R² is hydrogen or an alkyl consisting of 1–6 carbon atoms, which process comprises treating 3,5-bis-alkylthio(or benzylthio)-1,2,4-triazines according to the general formula II

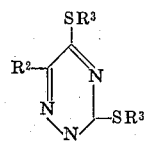   (II)

wherein R² is the same as in formula 1 and R³ is an alkyl consisting of 1–6 carbon atoms or the benzyl group, at room temperature with an equimolar amount of alkali metal alkoxides, preferably sodium alkoxides, in alkanos consisting of 1–6 carbon atoms or in benzyl alkohol, thereby forming 5-alkoxy(or benzyloxy)-3-alkylthio(or benzylthio)-1,2,4-triazine according to the general formula III

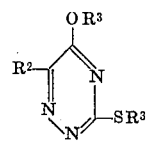   (III)

wherein R² and R³ are the same as in formulae I and II, treating the latter compound III with an excess of alkali metal alkoxides, preferably sodium alkoxides, in alkanols consisting of 1–6 carbon atoms or in benzyl alcohol, in the presence of alkylating agents, preferably methyl iodide, or in the presence of anhydrous salts of heavy metals, preferably mercuric salts, at elevated temperatures, preferably at 60°–100°C, thereby forming 3,5-di-alkoxy(or benzyloxy)-1,2,4-triazines according to the general formula IV

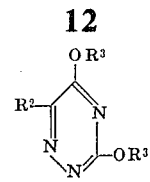   (IV)

wherein R² and R³ are the same as in formula II, condensing the aforesaid compounds III or IV with peracylribofuranosyl halides, thereby forming (from compounds III) the 2-(2,3,5-tri-O-acyl-β-D-ribofuranosyl)-3-alkylthio(or benzoylthio)-1,2,4-triazin-5(2H)-ones according to the general formula V

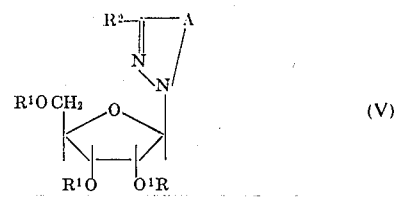   (V)

wherein A is a

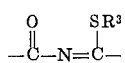

group and R¹, R² and R³ are the same as in formulae I and II, or forming (from compounds IV) the 2-(2,3,5-tri-O-acyl-β-D-ribofuranosyl)-5-alkoxy(or benzyloxy)-1,2,4-triazin-3(2H—ones according to the aforesaid general formula V, wherein A is a

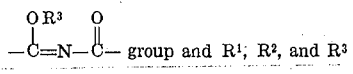 group and R¹, R², and R³ are the same as in formulae I and II, dealkylating or hydrolyzing selectively the aforesaid compounds according to the general formula V, wherein A is the

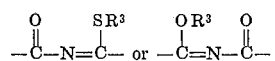

group and R¹, R², and R³ are the same as in formulae I and II, thereby forming the 6-azapyrimidime nucleosides according to the general formula I, wherein R¹ is an acetyl or benzoyl and R² is hydrogen or an alkyl consisting of 1–6 carbon atoms and converting the latter compounds, if required, by known procedure, namely, amonolysis or alcoholysis into compounds according to the general formula I.

2. Process in accordance with claim 1, in which process the condensation of compounds III or IV with peracylribofuranosyl halides is performed within the temperature range of 60°–150°C, preferably 80°–100°, in the medium of an inert solvent, preferably acetonitrile, or at room temperature in the presence of mercuric salts, preferably mercuric bromide, in the medium of an inert solvent, preferably acetonitrile.

3. Process in accordance with claim 1, in which process the selective hydrolysis of compounds according to the general formula V wherein A is the

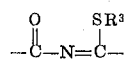

group and R¹, R², and R³ are the same as in formulae I and II, is performed in the medium of acetic acid — water in the presence of 1–2 equivalents of hydrogen peroxide or also in the presence of sodium acetate.

4. Process in accordance with claim 1 in which process the compounds according to the general formula V wherein A is the

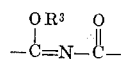

group and $R^1$, $R^2$, and $R^3$ are the same as in formulae I and II, are dealkylated by the action of hydrogen halides, preferably hydrogen chloride, in aprotic solvents, preferably benzene or ether, at room temperature, or are subjected to a selective hydrolysis, preferably by the action of hydrochloric acid in an aqueous-alcoholic medium.

* * * * *